United States Patent
Houser et al.

(10) Patent No.: US 10,256,612 B2
(45) Date of Patent: Apr. 9, 2019

(54) ROTARY STRIPPING DEVICE

(71) Applicant: TYCO ELECTRONICS CORPORATION, Berwyn, PA (US)

(72) Inventors: Matthew Steven Houser, Jonestown, PA (US); Christopher John Karrasch, Carlisle, PA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 158 days.

(21) Appl. No.: 15/277,032

(22) Filed: Sep. 27, 2016

(65) Prior Publication Data

US 2018/0090918 A1 Mar. 29, 2018

(51) Int. Cl.
*H02G 1/12* (2006.01)

(52) U.S. Cl.
CPC ........... *H02G 1/1265* (2013.01); *H02G 1/127* (2013.01)

(58) Field of Classification Search
CPC .. H02G 1/1265; H02G 1/1248; H02G 1/1256; H02G 1/1295; H02G 1/12; G02B 6/245
See application file for complete search history.

(56) References Cited

U.S. PATENT DOCUMENTS

| | | | |
|---|---|---|---|
| 2,401,149 A | * | 5/1946 | Gordon ................ H02G 1/1265 81/9.51 |
| 3,921,472 A | | 11/1975 | Gudmestad et al. |
| 4,597,176 A | * | 7/1986 | Shields ................ G02B 6/4498 29/564.4 |
| 4,745,828 A | | 5/1988 | Stepan |
| 6,736,032 B2 | | 5/2004 | Hombu |
| 6,910,256 B2 | | 6/2005 | Locher et al. |
| 7,178,434 B2 | | 2/2007 | Palmowski |
| 7,597,030 B2 | | 10/2009 | Stepan et al. |
| 8,234,772 B2 | | 8/2012 | Locher et al. |
| 8,739,657 B2 | | 6/2014 | Nakamura |
| 2013/0074345 A1 | | 3/2013 | Zick et al. |

OTHER PUBLICATIONS

International Search Report, International Application No. PCT/IB2017/055901, dated Sep. 27, 2017.

* cited by examiner

*Primary Examiner* — Robert J Scruggs

(57) ABSTRACT

A rotary stripping device for a wire includes a support panel having a wire opening configured to receive an end of the wire and a wire stripper mounted to the support panel. The wire stripper includes an actuating wheel and a blade wheel independently movable relative to the actuating wheel. The wheels have wire openings aligned with the wire opening of the support panel to receive the wire. The wire stripper has a stripper blade held by the blade wheel having a cutting edge configured to engage the wire. The wire stripper has an actuator associated with the actuating wheel operably coupled to the stripper blade to move the stripper blade. The actuator causes the stripper blade to move as the actuating wheel is moved relative to the blade wheel to move the cutting edge of the stripper blade relative to the wire opening in the blade wheel.

21 Claims, 8 Drawing Sheets

ROTARY STRIPPING DEVICE

BACKGROUND OF THE INVENTION

The subject matter herein relates generally to rotary stripping devices.

Wire stripping is typically performed to remove one or more layers of the wire, such as for termination to another component. For example, a cable jacket, a cable braid and/or an insulator of a wire may be stripped, such as for termination to a terminal, connector, circuit board, and the like.

Currently, there are two main forms of wire stripping, namely inline stripping and rotary stripping. Inline stripping uses two blades, often V-shaped, which close toward each other to pierce the wire insulation. The blades then pull the insulation off of the wire. However, the insulation is typically torn where the blades were unable to cut. Inline stripping mechanisms do not tend to provide clean cuts, cannot easily be used to remove different layers of the wire and are often difficult to adjust and can be expensive. Rotary stripping devices use blades that rotate around the wire closing toward each other to pierce the wire insulation. Rotary stripping devices cut the insulation radially around the wire, which allows precise cutting of the insulation and avoid tearing of the insulation when the end is removed. Rotary stripping may be necessary for some applications, such as to strip coaxial cable, which cannot be stripped using inline stripping. However, conventional rotary stripping devices are often very expensive, large and require a significant amount of expertise and control to operate.

Furthermore, some devices provide wire cutting to cut a wire to length. Wire cutters typically use two blades that close on each other to cut the wire. However, wire cutters tend to deform the end of the wire, which may make inserting the wire into a terminal difficult.

A need remains for a reliable and cost effective stripping device.

BRIEF DESCRIPTION OF THE INVENTION

In one embodiment, a rotary stripping device for a wire is provided including a support panel having a wire opening configured to receive an end of the wire and a wire stripper mounted to the support panel. The wire stripper includes an actuating wheel and a blade wheel independently movable relative to the actuating wheel. The actuating wheel has a wire opening aligned with the wire opening of the support panel to receive the wire. The blade wheel has a wire opening aligned with the wire opening of the support panel to receive the wire. The wire stripper has a stripper blade held by the blade wheel having a cutting edge configured to engage the wire. The wire stripper has an actuator associated with the actuating wheel operably coupled to the stripper blade to move the stripper blade. The actuator causes the stripper blade to move as the actuating wheel is moved relative to the blade wheel to move the cutting edge of the stripper blade relative to the wire opening in the blade wheel.

In another embodiment, a rotary stripping device for a wire is provided including a frame, a support panel supported by the frame having a wire opening configured to receive an end of the wire, a driver supported by the frame having a motor, a drive shaft driven by the motor, and a drive wheel driven by the drive shaft, and a wire stripper supported by the support panel. The wire stripper includes an actuating wheel engaging and driven by the drive wheel and a blade wheel engaging and driven by the drive wheel. The wheels having wire openings aligned with the wire opening of the support panel to receive the wire. The wire stripper has a stripper blade held by the blade wheel having a cutting edge configured to engage the wire. The wire stripper has an actuator associated with the actuating wheel operably coupled to the stripper blade to move the stripper blade. As the drive wheel is rotated, the actuating wheel is configured to move independent from the blade wheel such that the actuator moves the stripper blade relative to the wire opening in the blade wheel.

In a further embodiment, a rotary stripping device for a wire is provided including a frame, a support panel supported by the frame having a wire opening configured to receive an end of the wire, a first driver supported by the frame having a first motor, a first drive shaft driven by the first motor, and a first drive wheel driven by the first drive shaft and a second driver supported by the frame having a second motor, a second drive shaft driven by the second motor, and a second drive wheel driven by the second drive shaft. The second driver is operated independently from the first driver. A wire stripper is supported by the support panel. The wire stripper includes an actuating wheel engaging and driven by the first drive wheel and a blade wheel engaging and driven by the second drive wheel. The wheels have wire openings aligned with the wire opening of the support panel to receive the wire. The wire stripper has a stripper blade held by the blade wheel having a cutting edge configured to engage the wire. The wire stripper has an actuator associated with the actuating wheel operably coupled to the stripper blade to move the stripper blade. During operation, the first and second drive wheels are configured to rotate independently to rotate the actuating wheel independent from the blade wheel such that the actuator moves the stripper blade relative to the wire opening in the blade wheel.

DETAILED DESCRIPTION OF THE INVENTION

Figure 1:
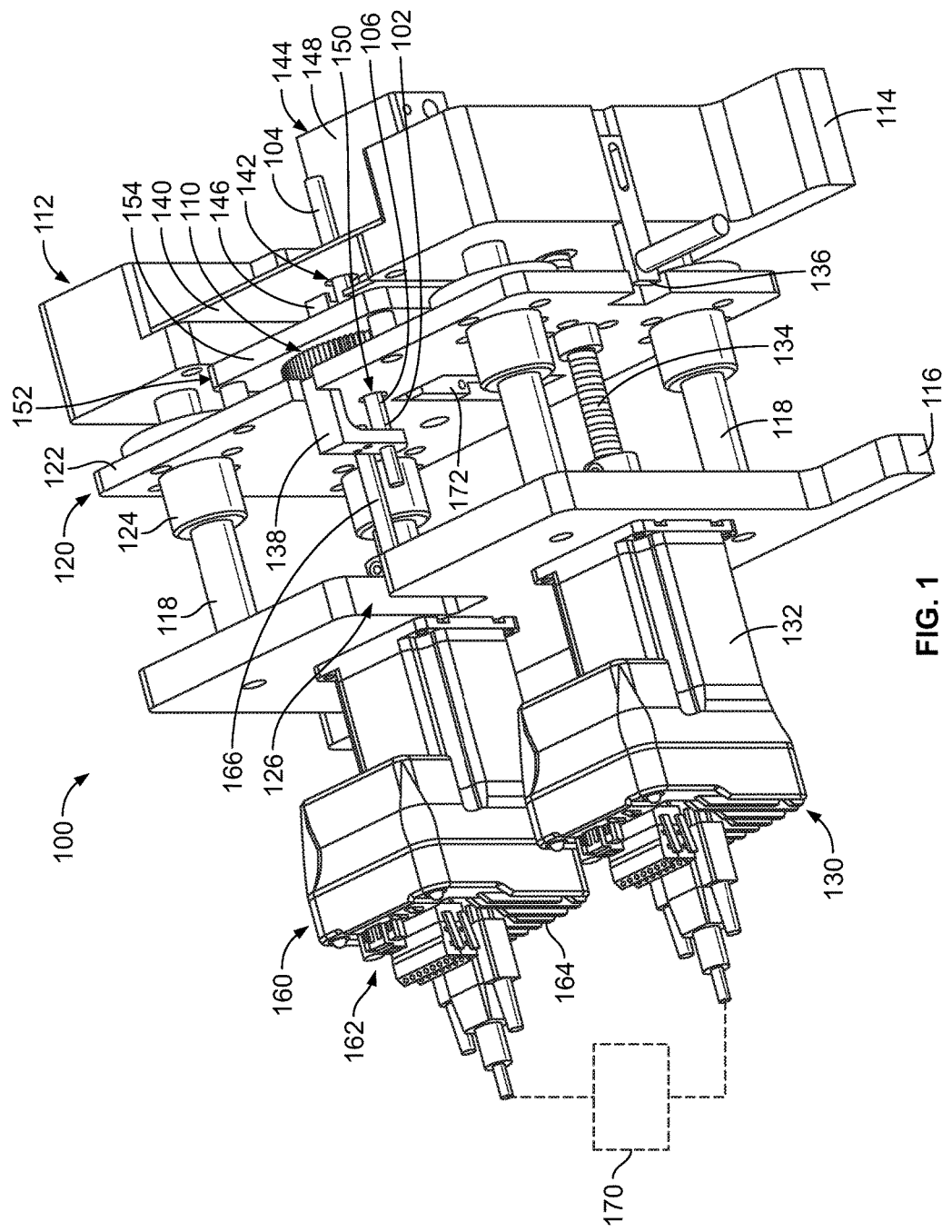
FIG. 1 is a perspective view of a rotary stripping device formed in accordance with an exemplary embodiment.

FIG. 1 is a perspective view of a rotary stripping device 100 formed in accordance with an exemplary embodiment.

Figure 2:
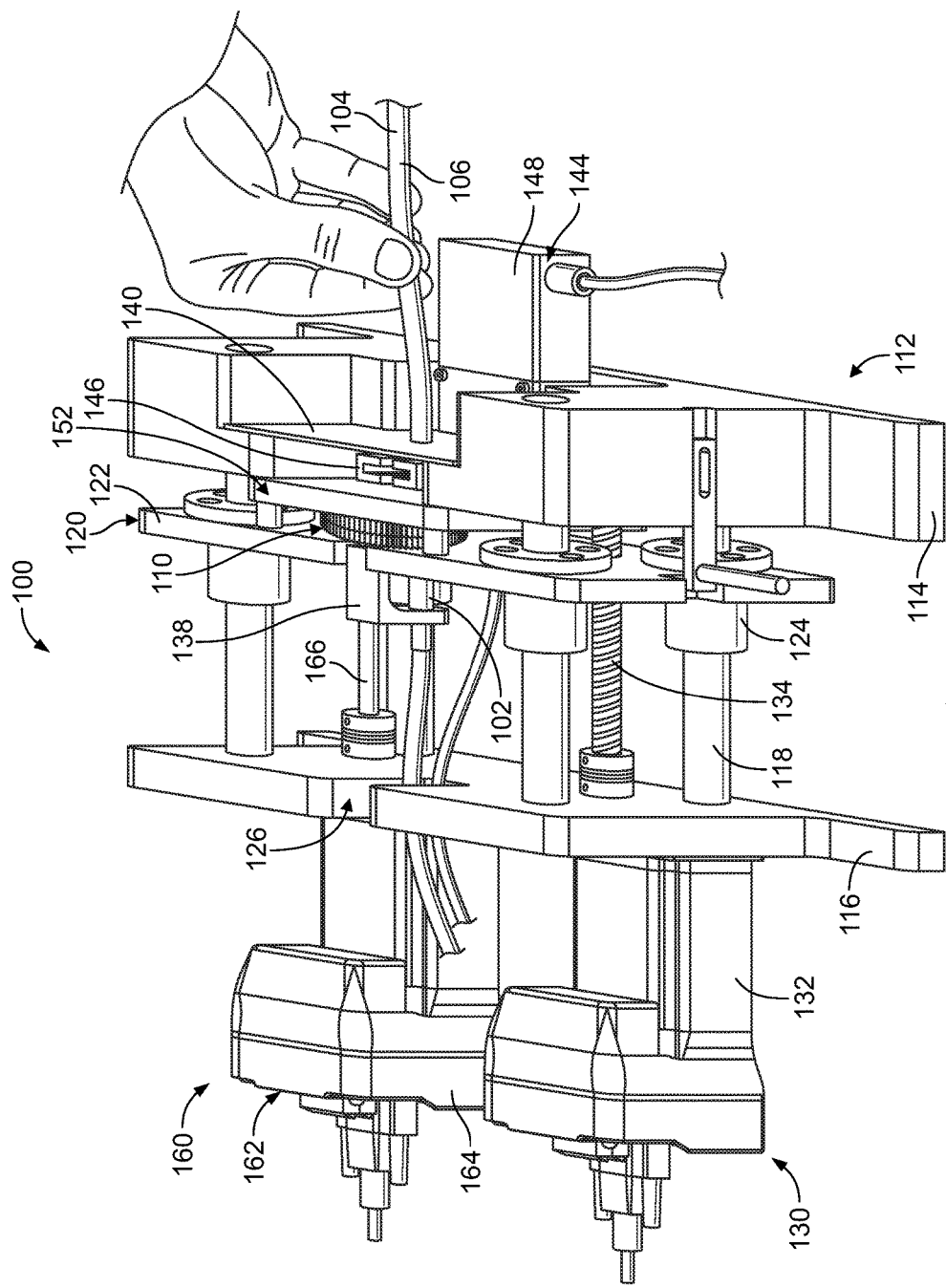
FIG. 2 is a front perspective view of the rotary stripping device.
Figure 3:
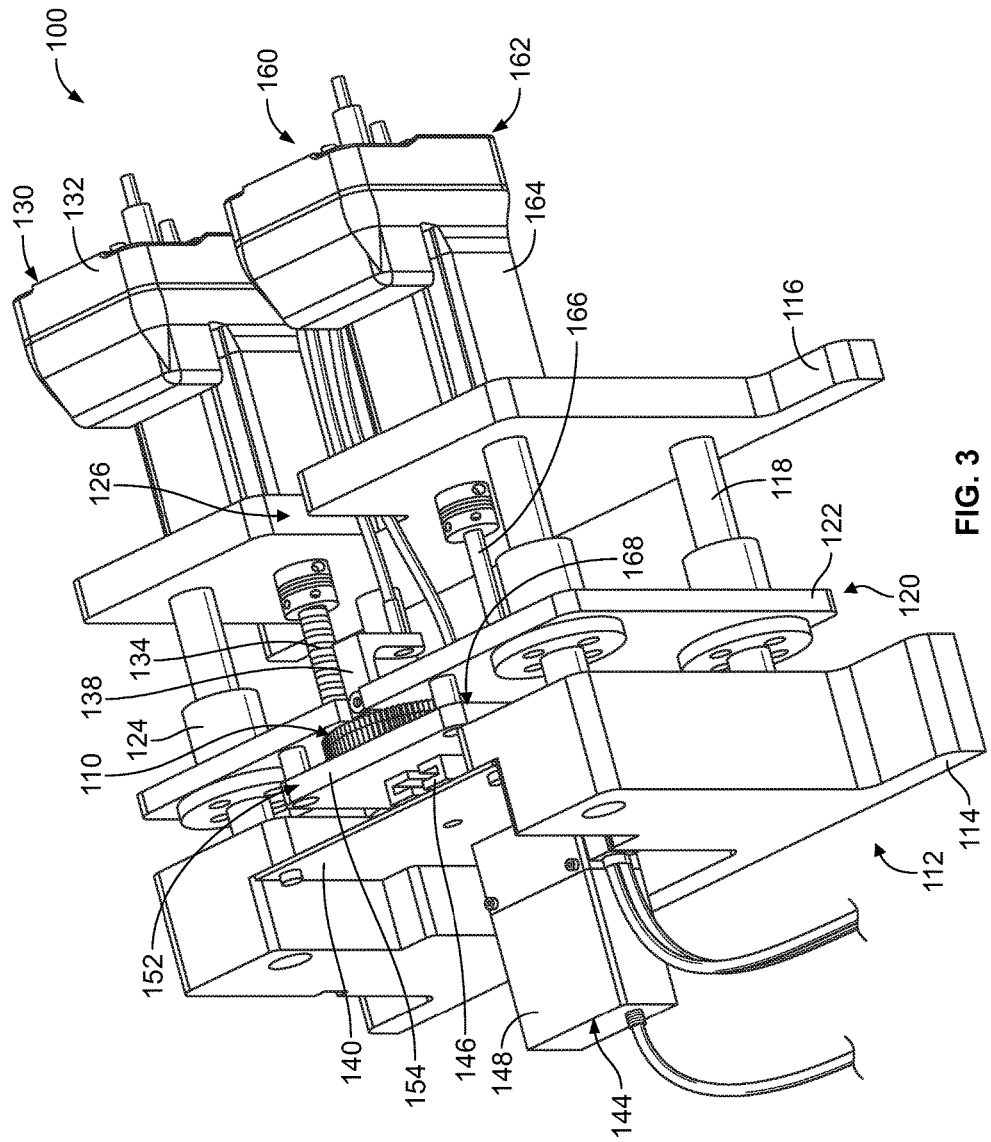
FIG. 3 is a front perspective view of the rotary stripping device.

FIG. 2 is a front perspective view of the rotary stripping device 100. FIG. 3 is a front perspective view of the rotary stripping device 100. The rotary stripping device 100 is used for stripping an end 102 of a wire 104 and/or cutting through the wire 104. For example, the rotary stripping device 100 may be used to strip an outer jacket 106 of the wire 104 and/or a cable braid of the wire 104 and/or an insulator of the wire 104. The rotary stripping device 100 may strip different layers of the wire 104 by controlling a depth of cutting through the wire 104.

The rotary stripping device 100 includes a wire stripper 110 used to cut through the wire 104. The wire stripper 110 includes multiple wheels that are independently movable relative to each other to control a cutting depth of blades of the wire stripper 110. The wheels may be gears, pulleys or other types of wheels. The wheels may be driven by one or more drive gears, drive pulleys, or other types of drivers. The wire stripper 110 may rotate around the wire 104. In an exemplary embodiment, the wire 104 passes through the wire stripper 110 to a predetermined depth for stripping the wire 104. Optionally, the wire 104 may be continuously passed through the wire stripper 110 to strip different sections of the wire 104. For example, the rotary stripping device 100 may be used as part of a lead maker machine used to apply terminals to ends of the wire 104 during a lead making process. By allowing the wire 104 to continuously pass through the rotary stripping device 100, the rotary stripping device 100 facilitates the lead making process to advance the lead making process more quickly.

In an exemplary embodiment, the rotary stripping device 100 includes a frame 112 supporting various components of the rotary stripping device 100. The frame 112 includes a front panel 114 and a rear panel 116 with supports 118 extending therebetween. The frame 112 may include other components in other various embodiments, such as additional panels to partially or entirely enclose the rotary stripping device 100.

The rear panel 116 includes a wire opening 126 configured to receive the wire 104. For example, the wire 104 may pass through the wire opening 126 after the stripping operation to pass the wire 104 to a different station or machine. Optionally, a predetermined length of the wire 104 may be passed through the wire opening 126 to strip the opposite end of the wire 104.

In an exemplary embodiment, the rotary stripping device 100 includes a carriage 120 supported by the frame 112. The carriage 120 is movable between the front and rear panels 114, 116, such as along the support 118. The carriage 120 may support and carry the wire stripper 110 to control a position of the wire stripper 110 relative to the frame 120. For example, the carriage 120 may be moved back and forth to allow the wire stripper 110 to strip different portions of the wire 104, such as the outer jacket 106, the cable braid and the insulator during different stripping processes. In alternative embodiments, the wire 104 may be moved relative to the wire stripper 110 to control the stripping depth, such as to strip different layers of the wire 104.

In an exemplary embodiment, the carriage 120 includes a support panel 122 that supports the wire stripper 110. The support panel 122 is coupled to the support 118. In an exemplary embodiment, the support panel 122 is slidable along the support 118. For example, bushings 124 may be coupled to the support panel 122 that slide along the support 118.

In an exemplary embodiment, the rotary stripping device 100 includes a carriage driver 130 for controlling the position of the carriage 120. For example, the carriage driver 130 includes a carriage motor 132 mounted to the frame 112, such as the rear panel 116 of the frame 112. The carriage driver 130 includes a carriage drive shaft 134 extending from the carriage motor 132 to the support panel 122. The carriage motor 132 is operated to move the drive shaft 132, which in turn moves the carriage 120. The carriage motor 132 may be an electric motor used to rotate the drive shaft 134 to control a position of the carriage 120. Other types of carriage drivers 130 may be used in alternative embodiments, such as a pneumatic driver, a hydraulic driver, or another type of driver.

In an exemplary embodiment, the rotary stripping device 100 includes a carriage position sensor 136 used to sense a position of the carriage 120. The carriage driver 130 may be controlled based on position data from the carriage position sensor 136. The carriage position sensor 136 may be a proximity sensor, a homing sensor, or another type of position sensor. In the illustrated embodiment, the carriage position sensor 136 is mounted to the front panel 114; however, the carriage position sensor 136 may be located at other positions in alternative embodiments.

In an exemplary embodiment, the rotary stripping device 100 includes a wire position sensor 138 for detecting a position of the wire 104 relative to the rotary stripping device 100. The wire position sensor 138 may be used to control the depth of loading the wire 104 into the rotary stripping device 100. The wire position sensor 138 may be used to control operation of the carriage driver 130. For example, the carriage driver 130 may be positioned relative to the wire 104 as sensed by the wire position sensor 138.

The rotary stripping device 100 includes a locating panel 140 used for locating the wire 104 relative to the wire stripper 110. The locating panel 140 includes an opening 142 that receives the wire 104. The wire 104 passes through the opening 142 into the wire stripper 110. In an exemplary embodiment, the rotary stripping device 100 includes a clamping mechanism 144 used to clamp to the wire 104 to hold the axial position of the wire 104 during the wire stripping process. For example, the clamping mechanism 144 may include opposing clamping arms 146 that may be closed around the wire 104. The clamping mechanism 144 includes an actuator 148 for opening and closing the clamping arms 146. The actuator 148 may be an electric actuator, a pneumatic actuator, a hydraulic actuator, or another type of actuator. The clamping mechanism 144 may be supported by the frame 112, such as the front panel 114.

In the illustrated embodiment, the rotary stripping device 100 is a table top tool used to be mounted to a table or a bench. The rotary stripping device 100 may be used as part of another system, such as a lead maker. In the embodiment of a lead maker, the wire 104 may be automatically fed to the rotary stripping device 100 by the lead maker. In other embodiments, the rotary stripping device 100 may be a standalone component where the wire 104 may be hand fed to the rotary stripping device 100. In other various embodiments, rather than providing the frame 112 and the various components mounted to the frame, the wire stripper 110 may be used as part of a hand-held tool, such as attached to an end of a drill, where the wire stripper 110 may be used to strip the end of the wire 104, which may also be hand-held.

In the illustrated embodiment, the wire stripper 110 is mounted to the support panel 122. The wire stripper 110 may be mounted to other components, such as directly to the frame 112 in alternative embodiments, such as embodiments that do not require a movable carriage 120. The support panel 122 includes a wire opening 150 that receives the end 102 of the wire 104. The wire 104 passes through the wire stripper 110 from the locating panel 140 to the wire opening 150 of the support panel 122. The wire 104 may be supported on both sides of the wire stripper 110 by the support panel 122 and the locating panel 140. In the illustrated embodiment, the support panel 122 is generally planar. For example, the support panel 122 may be plate-like. However, in alternative embodiments, the support panel 122 may have other shapes. In an exemplary embodiment, the wire stripper 110 includes a housing 152 holding various components of the wire stripper 110. The housing 152 may be mounted to the support panel 122. In other various embodiments, the housing 152 may include the support panel 122. The housing 152 may hold the wheels and/or blades used to strip the end of the wire 104. The housing 152 may include one or more housing panels 154 surrounding various components of the wire stripper 110. The wire 104 may pass through one or more of the housing panels 154.

The rotary stripping device 100 includes a driver assembly 160 for driving operation of the wire stripper 110. In the illustrated embodiment, the driver assembly 160 includes a driver 162 supported by the frame 116. The driver 162 includes a motor 164, and drive shaft 166 driven by the motor 164, and a drive wheel 168 (FIG. 3) driven by the drive shaft 166. The drive wheel 168 is configured to engage and drive the wheels of the wire stripper 110, as described in further detail below. In the illustrated embodiment, the driver assembly 160 includes a single driver 162 for controlling operation of the wire stripper 110. In an alternative embodiment, the driver assembly 160 may include more than one driver, such as for independently controlling the wheels of the wire stripper 110.

In an exemplary embodiment, the motor 164 is an electric motor, such as a stepper motor. The motor 164 may be driven forward or reverse to change rotation of the drive shaft 166. Other types of motors may be used in alternative embodiments.

The drive shaft 166 extends from the motor 164, mounted to the rear panel 116, to the support panel 122. The drive shaft 166 may pass through the support panel 122 to operably engage the drive wheel 168, which may be received in the housing 152. Optionally, the drive shaft 166 may be supported at a distal end by the front panel 114.

In an exemplary embodiment, the driver assembly 160 includes a controller 170 for controlling operation of the driver 162. The controller 170 may be programmable by the user to control operation of the rotary stripping device 100. For example, the user may provide inputs to control the cutting depth, the number of layers to be stripped, the speed of rotation, the carriage position, control of the clamping mechanism, or other input to the controller 170. The controller 170 may receive feedback from the various position sensors to control operation of the driver assembly 160 and/or the carriage driver 130, and/or the clamping mechanism 144.

In an exemplary embodiment, the rotary stripping device 100 includes a wheel position sensor 172 for sensing the positions of the wheels of the wire stripper 110. Position data from the wheel position sensor 172 may be transmitted to the controller 170 for controlling operation of the driver assembly 160. Any type of wheel position sensor 172 may be provided to sense the position of one or more of the wheels of the wire stripper 110. For example, the wheel position sensor 172 may be a light sensor configured to direct light towards the wheels of the wire stripper 110. When openings in the wheels are aligned with the wheel position sensor 172, the light may pass through the wheels to determine the position of the wheels of the wire stripper 110 (for example, a starting position of the wheels). Other types of position sensors may be used in alternative embodiments.

Figure 4:
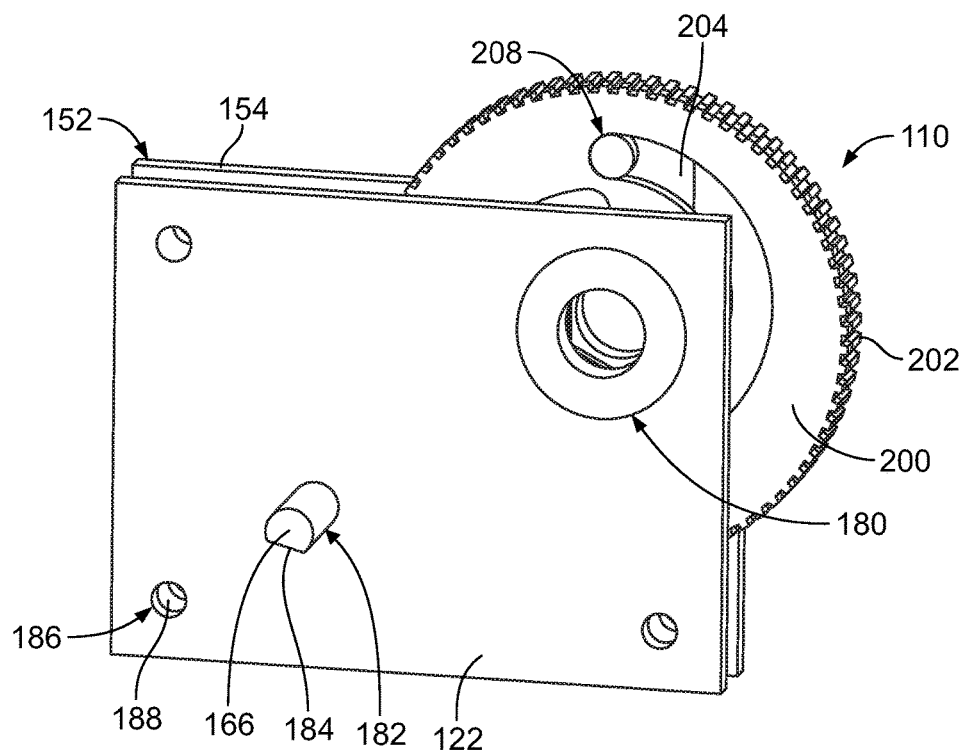
FIG. 4 is a perspective view of a wire stripper of the rotary stripping device in accordance with an exemplary embodiment.

FIG. 4 is a perspective view of the wire stripper 110 in accordance with an exemplary embodiment. FIG. 4 illustrates the wire stripper 110 positioned in the housing 152 showing a portion of the support panel 122 used to support the wire stripper 110. The drive shaft 166 is illustrated in FIG. 4 extending though the support panel 122. The support panel 122 includes a wheel opening 180 that receives a portion of the wheels of the wire stripper 110 and/or a bushing used to support the wheels of the wire stripper 110. The wheel opening 180 defines a wire opening in the support panel 122 configured to receive the wire 104 (shown in FIG. 1).

The support panel 122 includes a drive shaft opening 182 that receives the drive shaft 166. In the illustrated embodiment, the drive shaft 166 is noncircular and includes a driving surface 184 used to drive the drive wheel 168 (shown in FIG. 3). For example, the drive wheel 168 may be "D" shaped having a flat surface defining the driving portion 184. The support panel 122 includes openings 186 that receive fasteners used to secure the housing 152 of the wire stripper 110 to the support panel 122. Spacers 188 may be aligned with the openings 186 to space the housing panel 154 of the housing 152 apart from the support panel 122, forming a space there between that receives the drive wheel 168 and the wheels of the wire striper 110.

The wire stripper 110 includes an actuating wheel 200 and a blade wheel 202 independently movable relative to the actuating wheel 200. The wire stripper 110 includes one or more stripper blades 204 held by the blade wheel 202 and one or more actuators 208 used to move the stripper blades 204 during relative movement between the actuating wheel 200 and the blade wheel 202. The stripper blades 204 are operably coupled to the actuating wheel 200. The stripper blades 204 are used to strip the end of the 104 during operation of the wire stripper 110. Optionally, the actuator(s) 208 may be cam actuators including a cam received in a cam slot. For example, the stripper blades 204 may include cams received in cam slots in the actuating wheel 200. Alternatively, the stripper blades 204 may include cam slots and the actuating wheel 200 may include cams. In other various embodiments, the actuators 208 may include links operably coupled between the stripper blades 204 and the actuating wheel 200. The actuators 208 may include wedges on the actuating wheel 200 used to drive the stripper blades 204. Other types of actuators 208 may be used in alternative embodiments.

The actuating wheel 200 and the blade wheel 202 are axially aligned and in close proximity to each other. Optionally, the actuating wheel 200 may abut against the blade wheel 202. The actuating wheel 200 is rotatable relative to the blade wheel 202 and/or the blade wheel 202 is rotatable relative to the actuating wheel 200. In an exemplary embodiment, the actuating wheel 200 and the blade wheel 202 are configured to be rotated at different speeds to provide relative rotation there between. In an exemplary embodiment, the actuating wheel 200 and the blade wheel 202 are rotated by a common drive wheel 168. However, in alternative embodiments, the actuating wheel 200 may be rotated by a different drive wheel than the blade wheel 202.

Figure 5:
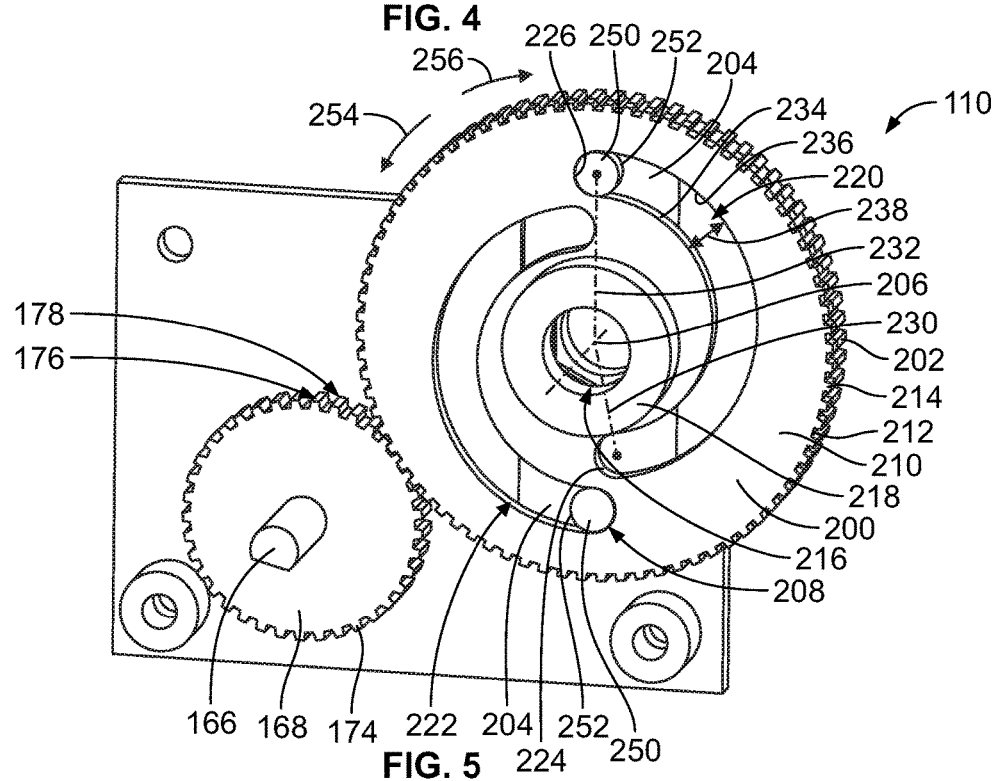
FIG. 5 illustrates the wire stripper in a first state where the stripper blades are open.
Figure 6:
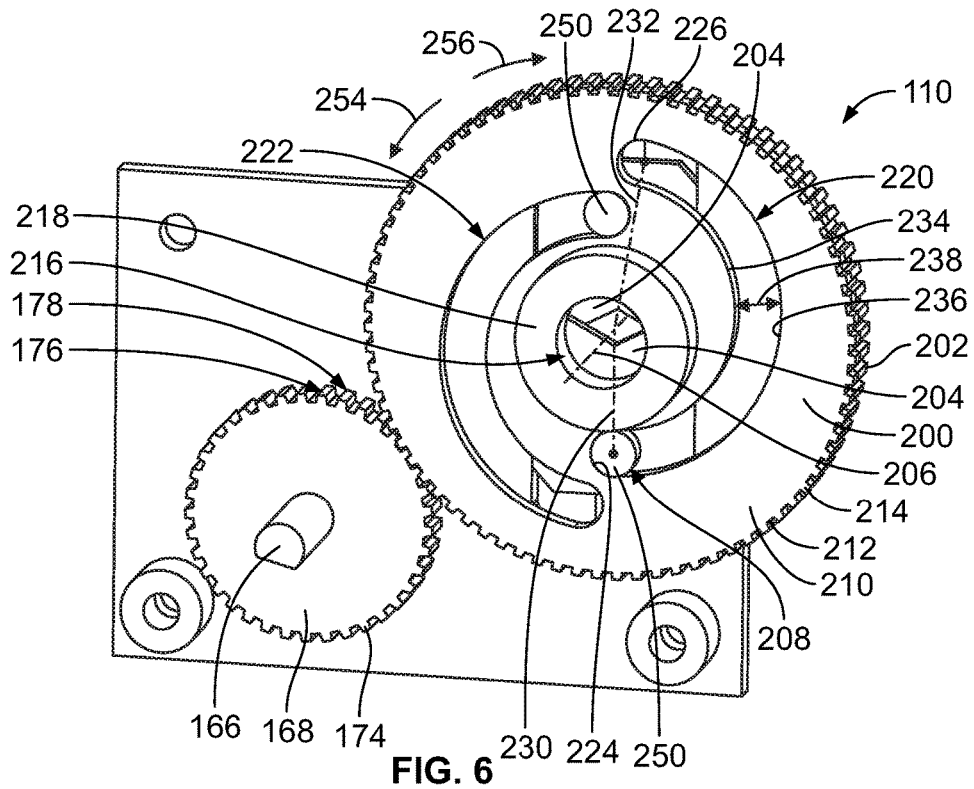
FIG. 6 illustrates the wire stripper in a second state where the stripper blades are closed.

FIG. 5 illustrates the wire stripper 110 in a first state where the stripper blades 204 are open. FIG. 6 illustrates the wire stripper 110 in a second state where the stripper blades 204 are closed. In the open state, the wire 104 is allowed to pass freely through the wire striper 110. The wire stripper 110 may be closed around the wire 104 to a predetermined depth at which the stripper blades 204 engage the wire 104 to strip the various layers of the wire 104. In an exemplary embodiment, the wire stripper 110 is rotated about an axis of rotation 206 around the wire 104 to cut one or more of the layers of the wire 104 during the stripping process. In an exemplary embodiment, as described in further detail below, the wire stripper 110 is rotated to close the stripper blades 204 around the wire 104. The wire stripper 110 may be rotated in an opposite direction to open the stripper blades 204 after the stripping process.

The drive wheel 168 receives and is rotated by the drive shaft 166. The drive wheel 168 may be rotated in a forward direction and a rearward direction to drive the wire stripper 110. In an exemplary embodiment, the drive wheel 168 is a drive gear and may include drive teeth 174 configured to drive the wheels 200, 202 of the wire stripper 110; however the drive wheel 168 may be another type of wheel in alternative embodiments, such as a pulley. In an exemplary embodiment, the drive wheel 168 includes a first set of drive teeth 176 and a second set of drive teeth 178. The first set of drive teeth 176 are configured to engage the actuating wheel 200 while the second set of drive teeth 178 are configured to engage the blade wheel 200. The drive teeth 176, 178 are configured to drive the wheels 200, 202 at different rates. For example, the drive wheel 168 may incrementally move the actuating wheel 200 at a different rate than the blade wheel 202. Optionally, the drive wheel 168 may rotate multiple times to achieve the desired amount of relative movement between the wheels 200, 202. For example, the wheels 200, 202 may need to be rotated approximately 40-50 times to close the stripper blades 204 to the appropriate depth around the wire. The number of revolutions of the wheels 200, 202 may depend on the size of the wire, the layer being cut, the starting position of the stripper blades 204, and the like.

Optionally, the first set of drive teeth 176 may include a different number of drive teeth 174 than the second set of drive teeth 178. For example, the first set of drive teeth 176 may include fewer drive teeth 174 than the second set of drive teeth 178. Optionally, the drive wheel 168 may have different diameters at the different portions having the first and second sets of drive teeth 176, 178. In other various embodiments, the first and second sets of drive teeth 176, 178 may be defined by the same drive teeth 174 having the same number of drive teeth in each set. However, in such embodiments, the wheels 200, 202 may have different numbers of teeth such that the wheels 200, 202 are rotated at different rates.

The actuating wheel 200 includes a wheel body 210 extending to a radially outer edge 212. In an exemplary embodiment, the actuating wheel 200 is a gear; however the actuating wheel 200 may be another type of wheel in alternative embodiments, such as a pulley. In the illustrated embodiment, the actuating wheel 200 includes gear teeth 214 at the outer edge 212. The gear teeth 214 are operably coupled to the first set of drive teeth 176 of the drive wheel 178. The wheel body 210 includes a wire opening 216 at the center of the wheel body 210. The wire opening 216 is aligned with the axis of rotation 206. The wire opening 216 receives the wire 104. The wheel body 210 includes a hub 218 around the wire opening 216. The hub 218 in configured to be received in the wheel opening 180 (shown in FIG. 4). The wheel body 210 may be rotated about the hub 218.

In an exemplary embodiment, the actuating wheel 200 includes one or more cam slots, such as a first cam slot 220 and a second cam slot 222, defining portions of the actuators 208. Optionally, the cam slots 220, 222 may be identical to each other but offset and oriented at different positions along the wheel body 210. The cam slots 220, 222 are non-concentric with the axis of rotation 206 of the actuating wheel 200. For example, one portion of the cam slot 220 may be shifted toward the radially outer edge 212 while another portion of the cam slot 220 may be positioned closer to the wire opening 216. The cam slot 220 extends along an acute path between an inner end 224 and an outer end 226.

The inner end 224 is positioned a first radial distance 230 from the axis of rotation 206 while the outer end 226 is positioned a second radial distance 232 from the axis of rotation 206. The second radial distance 232 is greater than the first radial distance 230. For example, as in the illustrated embodiment, the first radial distance 230 may be approximately twice the second radial distance 232.

The cam slot 202 includes an inner cam surface 234 extending between the inner and outer ends 224, 226 and an outer cam surface 236 extending between the inner and outer ends 224, 226. The outer cam surface 236 has a longer arc length than the inner cam surface 234. Optionally, the cam slot 220 may have a generally uniform separation distance 238 between the inner and outer cam surfaces 234, 236. Alternatively, the separation distance 238 may vary along the arc length of the cam slot 220. For example, the separation distance 238 may be greater at the inner end 224 than the outer end 226.

The stripper blades 204 include cam followers 250 defining portions of the actuators 208. The cam followers 250 extend into the cam slots 220, 222. The cam followers 250 move through the cam slots 220, 222 as the actuating wheel 200 is rotated relative to the blade wheel 202. For example, the cam follower 250 may include a follower surface 252 that engages the inner cam surface 234 and the outer cam surface 236 to close or open the stripper blades 204, respectively. For example, the inner cam surface 234 engages the cam follower 250 when the actuating wheel 200 is rotated in a first direction 254 relative to the blade wheel 202 to drive the stripper blade 204 closed, such as toward the wire 104. The outer cam surface 236 engages the cam follower 250 when the actuating wheel 200 is rotated in a second direction 256 relative to the blade wheel 202 to drive the stripper blade 204 open, such as away from the wire 104. For example, because the actuating wheel 200 is rotated at a different speed than the blade wheel 202, the actuating wheel 200 rotates relative to the blade wheel 202. As the actuating wheel 200 rotates in the first direction 254, the stripper blade 204 is closed. As the actuating wheel 200 rotates in the second 256 relative to the blade wheel 202, the stripper blade 204 is opened.

The actuating wheel 200 may move in the first direction 254 relative to the blade wheel 202 when the drive wheel 168 is rotated in a first direction, whereas the actuating wheel 200 may rotate in the second direction 256 relative to the blade wheel 202 when the drive wheel 168 is rotated in the opposite second direction. Because the actuating wheel 200 has a different number of teeth and/or a different diameter than the blade wheel 202, the actuating wheel 200 rotates at a different rate than the blade wheel 202. The common drive wheel 168 may be used to rotate both wheels 200, 202 at different rates. The stripper blades 204 are moved open and closed by the cam followers 250 passing through the cam slots 220, 224 as the actuating wheel 200 moves relative to the blade wheel 202. For example, as the cam follower 250 moves in the cam slot 220 from the outer end 226 to the inner end 224, the cam follower 250 is moved relatively closer to the axis of rotation 206, causing the stripper blade 204 to close. In contrast, as the cam follower 250 moves in the cam slot 220 from the inner end 224 toward the outer end 226, the cam follower 250 is moved further from the axis of rotation 206, causing the stripper blade 204 to open.

Figure 7:
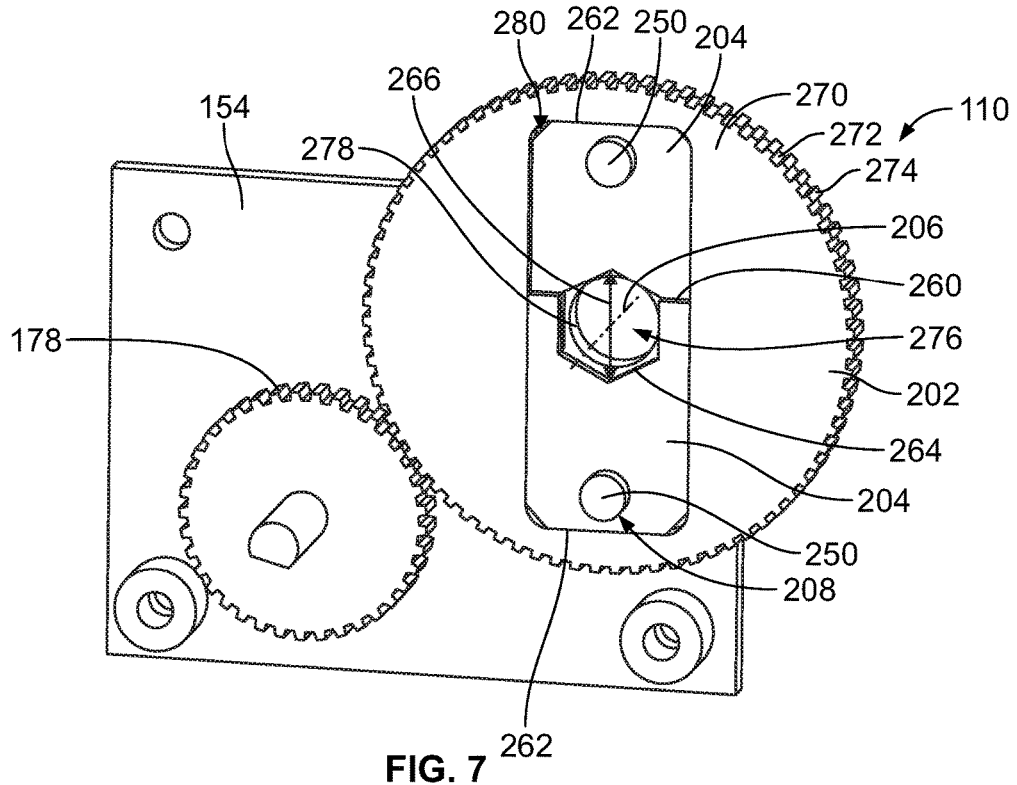
FIG. 7 illustrates a portion of the wire stripper with the actuating wheel removed for clarity showing the stripper blades in a first state where the stripper blades are open.
Figure 8:
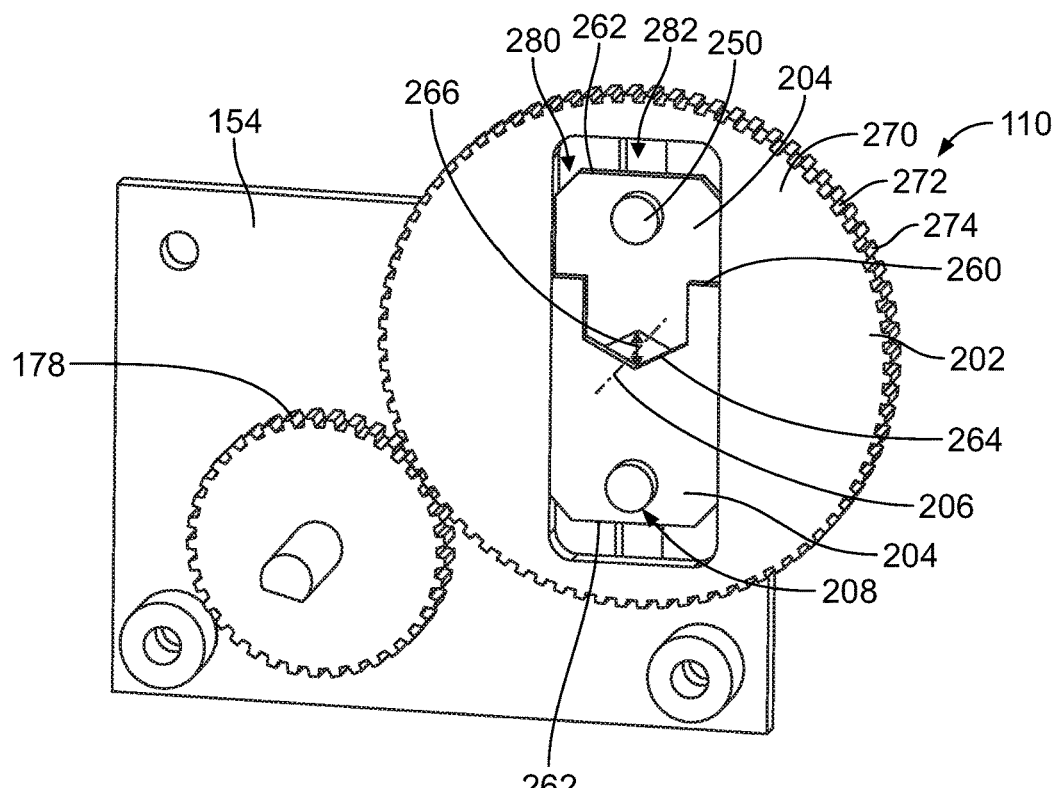
FIG. 8 illustrates a portion of the wire stripper in a second state where the stripper blades are closed.

FIG. 7 illustrates a portion of the wire stripper 110 with the actuating wheel 200 removed for clarity showing the blade wheel 202 and the stripper blades 204 in a first state where the stripper blades 204 are open. FIG. 8 illustrates a portion of the wire stripper 110 in a second state where the stripper blades 204 are closed. Each stripper blade 204 extends between a proximal end 260 and a distal end 262. The stripper blade 204 includes a cutting edge 264 at the proximal end 260. The cam follower 250 extends from the stripper blade 204 proximate to the distal end 262. In the illustrated embodiment, two stripper blades 204 are provided. The cutting edges 264 of the pair of stripper blades 204 generally surround the wire opening 276. For example, cutting edges 264 may be provided above and below the wire opening 276 and/or along the sides of the wire opening 276. As the stripper blades 204 are closed, the cutting edges 264 of the pair of stripper blades 204 are moved closer to each other to decrease a separation distance 266 between the cutting edges 264. The wire stripper 110 may be operated to drive the stripper blades 204 to a predetermined separation distance 266 based on the type of wire 104 and/or the layer of the wire being stripped. For example, the stripper blades 204 may be closed such that the separation distance 266 is substantially equal to the diameter of the layer of the wire being stripped such that the stripper blades 204 may cut through such layers for stripping such layers from the wire 104. The wire stripper 110 may include more stripper blades 204 such as four stripper blades 204.

The blade wheel 202 includes a wheel body 270 extending to a radially outer edge 272. In an exemplary embodiment, the blade wheel 202 is a gear; however, the blade wheel may be another type of wheel in alternative embodiments, such as a pulley. In the illustrated embodiment, the blade wheel 202 includes gear teeth 274 at the outer edge 272. The gear teeth 274 are operably coupled to the second set of drive teeth 178 of the drive wheel 178. The wheel body 270 includes a wire opening 276 at the center of the wheel body 270. The wire opening 276 is aligned with the axis of rotation 206. The wire opening 276 receives the wire 104. The wheel body 270 may include a hub 278 around the wire opening 276 configured to be received in a wheel opening in the housing panel 154. The wheel body 270 may be rotated about the hub 278.

The blade wheel 202 includes a blade slot 280 that receives the stripper blades 204. The blade slot 280 extends linearly along the wheel body 270 through the axis of rotation 206 and wire opening 276. The blade slot 280 confines movement of the stripper blades 204 to linear movement within the blade slot 280. In an exemplary embodiment, the wheel body 270 includes windows 282 open to the blade slot 280. The windows 282 receive portions of the stripper blades 204, such as knobs or posts extending from the stripper blades 204 generally opposite the cam followers 250. The windows 282 may confine movement of the stripper blades 204 in a linear direction.

Figure 9:
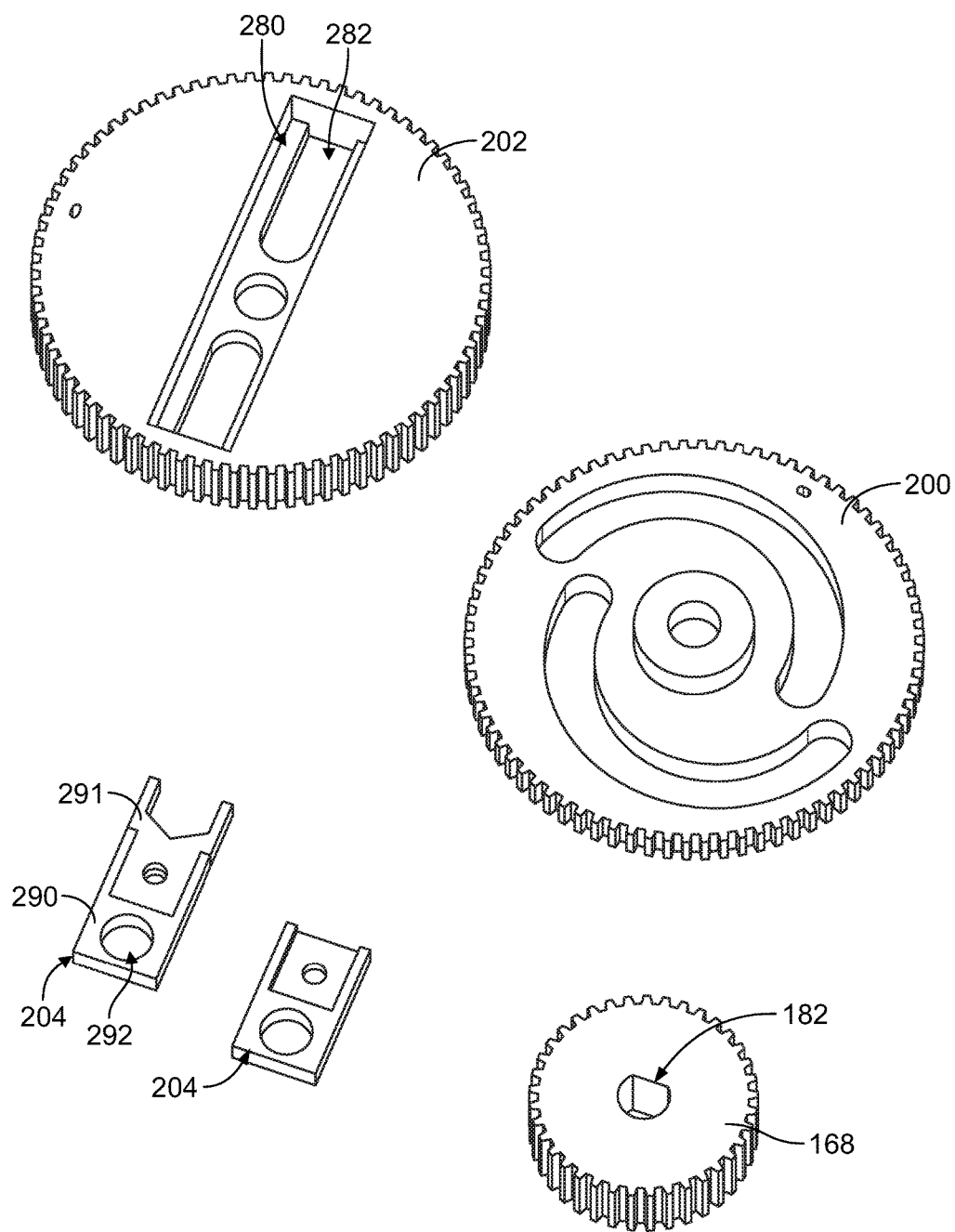
FIG. 9 is an exploded view of components of the rotary stripping device.

FIG. 9 is an exploded view of components of the rotary stripping device 100 showing the actuating wheel 200, the blade wheel 202, portions of the stripper blades 204, and the drive wheel 168. FIG. 9 shows the blade slots 280 and the windows 282 that receive the stripper blades 204. In an exemplary embodiment, each stripper blade 204 includes a blade carrier 290 configured to replaceably receive cutting blades 291 (one shown) such that the cutting blades 291 may be replaced, such as when the cutting blades get dull. The blade carriers 290 include openings 292 that may receive pins (not shown) defining the cam followers 250 and the projections configured to be received in the windows 292 in the blade wheel 202. For example, the pins may extend from both sides of the blade carrier 290. FIG. 9 shows the drive shaft opening 182 in the drive wheel 168 configured to receive the drive shaft 166. In the illustrated embodiment, the drive shaft opening 182 is non-cylindrical and includes a flat surface configured to engage the driving portion 184 of the drive shaft 166. In the illustrated embodiment, the drive shaft opening 182 is D-shaped; however, the drive shaft opening 182 may have other shapes in alternative embodiments.

Returning to FIGS. 5 and 6, during use, the drive wheel 168 is rotated to close the stripper blades 204. For example, as the drive wheel 168 is rotated, both the actuating wheel 200 and the blade wheel 202 are rotated by the drive wheel 168. However, the actuating wheel 200 is rotated at a different rate than the blade wheel 202 causing relative movement therebetween. As the drive wheel 168 continues to rotate, the stripper blades 204 may be closed. For example, the cam follower 250 may engage the outer cam surface 236 as the actuating wheel 200 rotates relative to the blade wheel 202 in the closing direction. The drive wheel 168 is rotated a predetermined number of revolutions to close the stripper blades 204 to a corresponding predetermined depth (based on the diameter of the wire 104 and the particular layer of the wire 104 being stripped). Once the stripper blade 204 is at the appropriate depth, the stripper blades 204 may be opened.

Optionally, the drive wheel 168 may rotate the wire stripper 110 at least partially around the wire 104 with the stripper blades 204 at the predetermined depth to ensure that the layer of the wire is completely cut through so that the layer may be removed. For example, the drive wheel 168 may be rotated back and forth (such that the stripper blades 204 essentially remain at the same depth) such that the stripper blade 204 engages all sides of the wire 104 at the appropriate depth to cut entirely through the wire.

In other various embodiments, the drive wheel 168 may rotate the wire stripper 110 with the stripper blades 204 at the same depth without moving stripper blades 204. For example, the separation distance 238 between the inner cam surface 234 and the outer cam surface 236 may be wider than the cam follower 250 such that rotation in the opening direction causes rotation of the wheels 200, 202 without corresponding movement of the stripper blade 204. For example, the wheels 200, 202 may rotate a partial revolution or one or more revolutions in the opening direction with the stripper blades 204 at a constant depth as the cam follower 250 transitions from the outer cam surface 236 to the inner cam surface 234. Once the cam follower 250 engages the inner cam surface 234, rotation of the wheels 200, 202 in the opening direction will then initiate opening of the stripper blades 204. For example, the cam follower 250 rides along the inner cam surface 234 toward the outer end 226. The drive wheel 168 may drive the wheels 200, 202 to the resting or normal position where the stripper blades 204 are fully opened.

Figure 10:
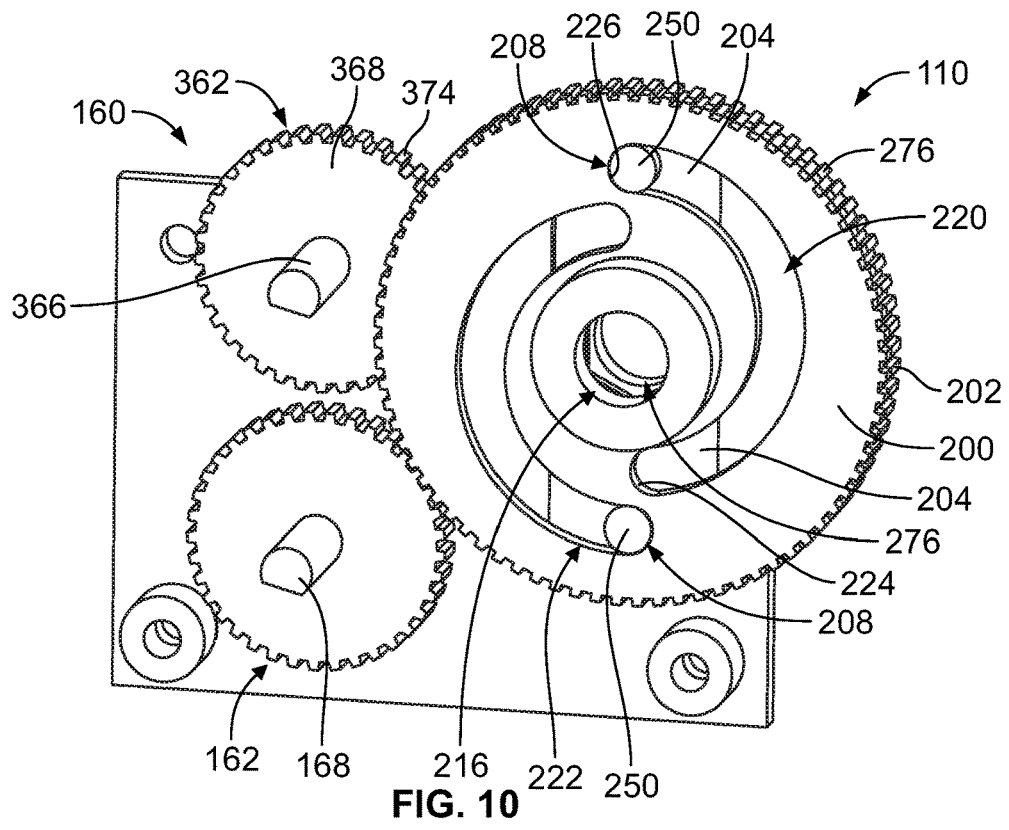
FIG. 10 illustrates the wire stripper and a driver assembly in accordance with an exemplary embodiment.

FIG. 10 illustrates the wire stripper 110 and the driver assembly 160 having a second driver 362. The driver assembly 160 also includes the first driver 162; however the first drive wheel 168 of the first driver 162 is only configured to engage the actuating wheel 200 and does not engage the blade wheel 202. The second driver 362 is configured to engage and operate the blade wheel 202 independent from the actuating wheel 200. The second driver 362 may include a second motor (not shown), which may be identical to the first motor 164 (shown in FIG. 1). The second driver 362 includes a second drive shaft 366 and a second drive wheel 368 driven by the second drive shaft 366.

In the illustrated embodiment, the second drive wheel 368 is a drive gear and includes drive teeth 374 configured to engage the gear teeth 274 of the blade wheel 202; however the drive wheel may be a pulley or other type of wheel in alternative embodiments. The second driver 362 may be operated independent from the first driver 162. For example, the first and second drivers 162, 362 may be operated at different speeds, in different directions, and the like. The second driver 362 rotates the blade wheel 202 forward and backward. The first driver 162 rotates the actuating wheel 202 forward and backward. When the actuating wheel 200 is moved relative to the blade wheel 202 the stripper blades 204 may be opened or closed by the actuators 208. For example, the actuating wheel 200 may be rotated to force the cam followers 250 to move in the cam slots 220, 222 to open or close the stripper blades 204.

In operation, once the wire 104 is received in the wire openings 216, 276, the stripper blades 204 may be closed around the wire 104. For example, the actuating wheel 200 may be rotated (while the blade wheel 202 is rotated or while the blade wheel 202 is stationary) to cause the cam followers 250 to move from the outer end 226 toward the inner end 224 to a predetermined position such that the cutting edges 264 of the stripper blades 204 cut through the wire 104. Optionally, the actuating wheel 200 and the blade wheel 202 may both be rotated at the final depth to ensure that the wire 104 is cut circumferentially around the wire 104 at the appropriate depth. The actuating wheel 200 may then be moved relative to the blade wheel 202 (while the blade wheel 202 rotates or while the blade wheel 202 is stationary) to open the stripper blades 204. For example, as the actuating wheel 200 rotates relative to the blade wheel 202, the cam followers 250 may move toward the outer end 226, thus opening the stripper blades 204.

Figure 11:
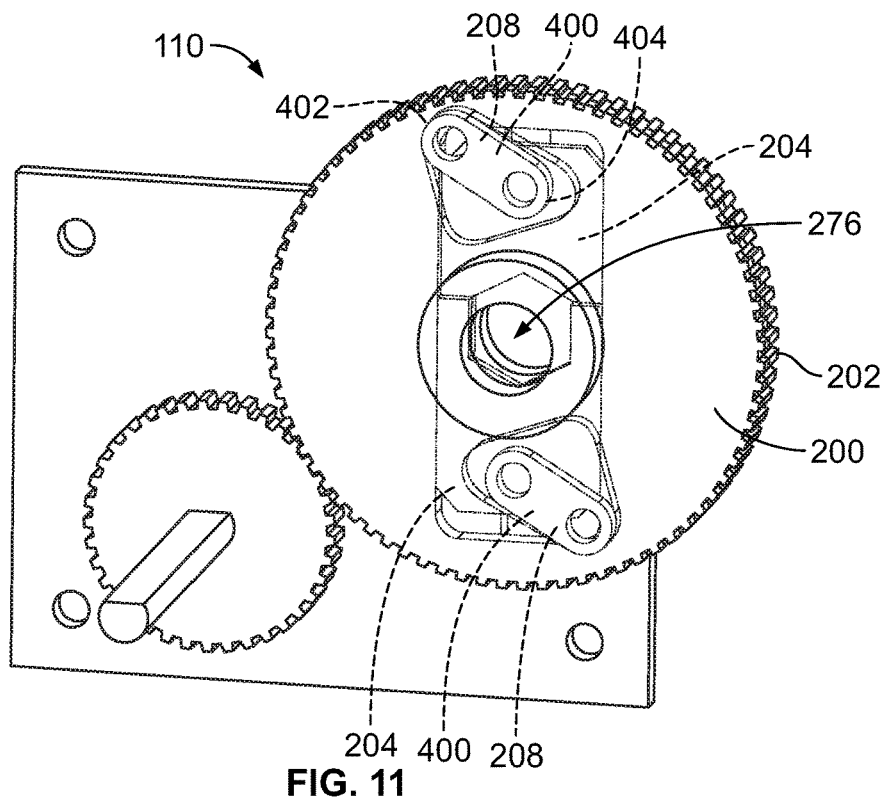
FIG. 11 is perspective view of the wire stripper in accordance with an exemplary embodiment.

FIG. 11 is perspective view of the wire stripper 110 in accordance with an exemplary embodiment. FIG. 11 illustrates the actuators 208 (shown in phantom) as links 400 between the actuating wheel 200 and the stripper blades 204 rather than the cams and cam slots illustrated in FIGS. 4-10. The links 400 are used to move the stripper blades 204 as the actuating wheel 200 is moved relative to the blade wheel 202.

The links 400 extend between a first end 402 and a second end 404. The link 400 is fixed at the first end 402 to the actuating wheel 200 and fixed at the second end 404 to the stripper blade 204. The links 400 may be pivoted relative to the actuating wheel 200 and the stripper blade 204 as the actuating wheel 200 is moved relative to the stripper blade 204. For example, as the actuating wheel 200 is rotated relative to the blade wheel 202 and the stripper blade 204, the angle of the link 400 changes. As the wire stripper 110 is operated, the second end 404 may be moved closer to the wire opening 276, causing the stripper blade 204 to close, and then the second end 404 may be moved away from the wire opening 276, causing the stripper blade 204 to open.

Other types of actuators 208 may be used in alternative embodiments. For example, rather than links, the wire stripper 110 may employ wedges that engage and drive the stripper blades 204 closed and then open as the actuating wheel 200 moves relative to the blade wheel 202.

Figure 12:
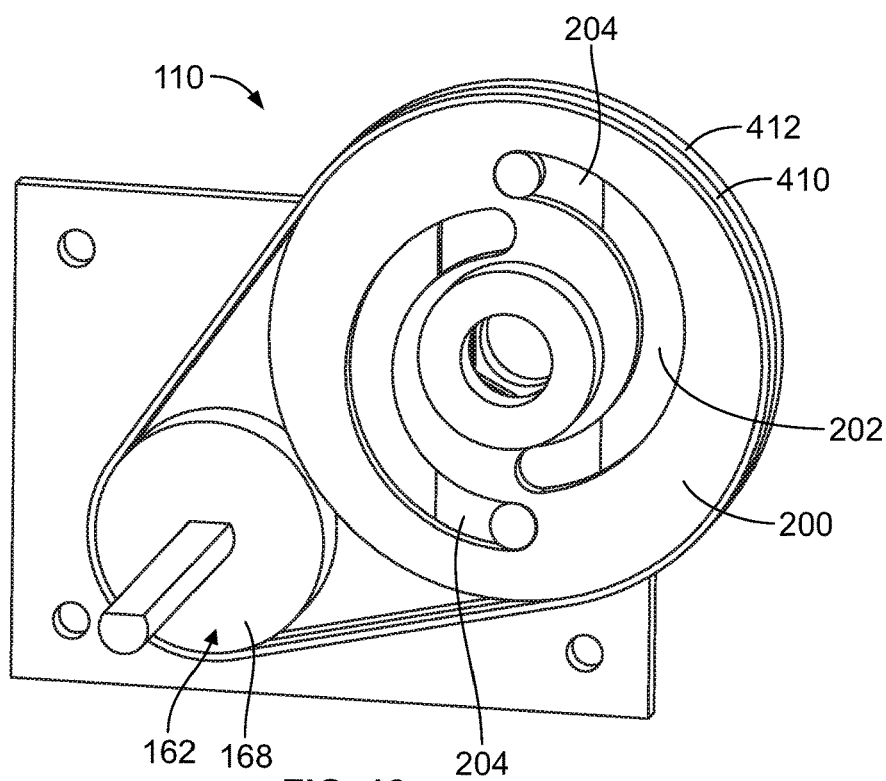
FIG. 12 is perspective view of the wire stripper in accordance with an exemplary embodiment.

FIG. 12 is perspective view of the wire stripper 110 in accordance with an exemplary embodiment. FIG. 12 illustrates the driver 162 as including belts 410, 412 to drive the actuating wheel 200 and the blade wheel 202, respectively. The drive wheel 168 is a pulley driving the belts 410, 412; however, in various embodiments the belts 410, 412 may be independently driven by different drive wheels. The actuating wheel 200 and the blade wheel 202 are pulleys that may be rotated relative to each other. Optionally, the wheels 200, 202 may have different diameters such that the wheels 200, 202 may be driven at different rates. Additionally or alternatively, the drive wheel 168 may have sections with different diameters for receiving the belts 410, 412.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A rotary stripping device for a wire comprising:
   a support panel having a wire opening configured to receive an end of the wire; and
   a wire stripper mounted to the support panel, the wire stripper comprising an actuating wheel and a blade wheel independently movable relative to the actuating wheel, the actuating wheel having a wire opening aligned with the wire opening of the support panel to receive the wire, the blade wheel having a wire opening aligned with the wire opening of the support panel to receive the wire, the wire stripper having a stripper blade held by the blade wheel having a cutting edge configured to engage the wire, the wire stripper having an actuator associated with the actuating wheel operably coupled to the stripper blade to move the stripper blade, the actuator causing the stripper blade to move as the actuating wheel is moved relative to the blade wheel to move the cutting edge of the stripper blade relative to the wire opening in the blade wheel, the wire stripper having a drive assembly rotating the actuating wheel and the blade wheel at different speeds.

2. The rotary stripping device of claim 1, wherein the actuating wheel and the blade wheel are axially aligned and in close proximity to each other.

3. The rotary stripping device of claim 1, wherein the actuating wheel has a different diameter than the blade wheel to rotate at a different rate than the blade wheel.

4. The rotary stripping device of claim 1, wherein the actuating wheel and the blade wheel are rotated by a common drive wheel of the drive assembly.

5. The rotary stripping device of claim 4, wherein the drive wheel includes gear teeth, the actuating wheel includes gear teeth interacting with the gear teeth of the drive wheel, and the blade wheel includes gear teeth interacting with the gear teeth of the drive wheel, the actuating wheel having a different number of teeth than the blade wheel causing the actuating wheel and the blade wheel to rotate at a different rate resulting in relative motion between the actuating wheel and the blade wheel.

6. The rotary stripping device of claim 1, wherein the drive assembly includes an actuator belt between a drive wheel and the actuating wheel driving the actuating wheel and a blade belt between the drive wheel and the blade wheel driving the blade wheel, wherein the actuating wheel has a different diameter than the blade wheel to rotate at a different rate than the blade wheel.

7. The rotary stripping device of claim 1, wherein the actuator is a link fixed at a first end to the actuating wheel and fixed at a second end to the stripper blade, wherein relative movement between the actuating wheel and the blade wheel causes relative movement of the stripper blade relative to the blade wheel.

8. The rotary stripping device of claim 1, wherein the blade wheel includes a blade slot receiving the stripper blade and confining movement of the stripper blade in a linear direction.

9. The rotary stripping device of claim 1, wherein the actuating wheel includes a cam slot, the stripper blade having a cam follower extending into the cam slot, the cam follower moving in the cam slot as the actuating wheel is moved relative to the blade wheel to move the cutting edge of the stripper blade relative to the wire opening in the blade wheel.

10. The rotary stripping device of claim 9, wherein the cam slot is non-concentric with an axis of rotation of the actuating wheel.

11. The rotary stripping device of claim 9, wherein the cam slot extends along an arcuate path between an inner end and an outer end, the inner end being a first radial distance from an axis of rotation of the actuating wheel, the outer end being a second radial distance from the axis of rotation of the actuating wheel greater than the first radial distance.

12. The rotary stripping device of claim 9, wherein the cam slot extends along an arcuate path between an inner end and an outer end, the cam slot having an inner cam surface and an outer cam surface, the inner cam surface engaging the cam follower when the actuating wheel is rotated in a first direction to drive the cutting edge toward the wire, the outer cam surface engaging the cam follower when the actuating wheel is rotated in a second direction to drive the cutting edge away from the wire.

13. The rotary stripping device of claim 1, wherein the stripper blade is a first stripper blade and the actuator is a first actuator, the wire stripper further comprising a second stripper blade on an opposite side of the wire opening from the first stripper blade, the second stripper blade being operably coupled to the second actuator, the first and second stripper blades being driven in opposite directions by rotation of the actuating wheel relative to the first and second stripper blades.

14. The rotary stripping device of claim 1, wherein the drive assembly includes a driver supported by a frame of the rotary stripping device, the driver having a motor, a drive shaft driven by the motor, and a drive wheel driven by the drive shaft, the drive wheel engaging and driving both the actuating wheel and the blade wheel.

15. The rotary stripping device of claim 1, wherein the drive assembly includes a first driver supported by a frame of the rotary stripping device, and a second driver supported by the frame, the first driver having a first motor, a first drive shaft driven by the first motor, and a first drive wheel driven by the first drive shaft, the second driver having a second motor, a second drive shaft driven by the second motor, and a second drive wheel driven by the second drive shaft, the second driver being operated independently from the first driver, the actuating wheel engaging and driven by the first drive wheel, the blade wheel engaging and driven by the second drive wheel.

16. The rotary stripping device of claim 1, further comprising a frame having a front panel and a rear panel, the rotary stripping device having a carriage including the support panel supporting the wire stripper, the carriage being movable between the front panel and the rear panel to move the wire stripper relative to the wire.

17. The rotary stripping device of claim 1, wherein the actuating wheel is rotated in a first direction to move a depth of the stripper blade in a driving direction and the actuating wheel is rotated in a second direction to move the depth of the stripper blade in a retracting direction, and wherein the stripper blade is rotatable about the wire without changing the depth as the actuating wheel transitions rotation from the first direction to the second direction.

18. A rotary stripping device for a wire comprising:
a frame;
a support panel supported by the frame, the support panel having a wire opening configured to receive an end of the wire;
a driver supported by the frame, the driver having a motor, a drive shaft driven by the motor, and a drive wheel driven by the drive shaft;
a wire stripper supported by the support panel, the wire stripper comprising an actuating wheel engaging and driven by the drive wheel and a blade wheel engaging and driven by the drive wheel, the actuating wheel having a wire opening aligned with the wire opening of the support panel to receive the wire, the blade wheel having a wire opening aligned with the wire opening of the support panel to receive the wire, the wire stripper having a stripper blade held by the blade wheel having a cutting edge configured to engage the wire, the wire stripper having an actuator associated with the actuating wheel operably coupled to the stripper blade to move the stripper blade;
wherein, as the drive wheel is rotated, the actuating wheel is configured to move independent from the blade wheel such that the actuator moves the stripper blade relative to the wire opening in the blade wheel.

19. A rotary stripping device for a wire comprising:
a frame;
a support panel supported by the frame, the support panel having a wire opening configured to receive an end of the wire;
a first driver supported by the frame, the first driver having a first motor, a first drive shaft driven by the first motor, and a first drive wheel driven by the first drive shaft;
a second driver supported by the frame, the second driver having a second motor, a second drive shaft driven by the second motor, and a second drive wheel driven by the second drive shaft, the second driver being operated independently from the first driver;

a wire stripper supported by the support panel, the wire stripper comprising an actuating wheel engaging and driven by the first drive wheel and a blade wheel engaging and driven by the second drive wheel, the actuating wheel having a wire opening aligned with the wire opening of the support panel to receive the wire, the blade wheel having a wire opening aligned with the wire opening of the support panel to receive the wire, the wire stripper having a stripper blade held by the blade wheel having a cutting edge configured to engage the wire, the wire stripper having an actuator associated with the actuating wheel operably coupled to the stripper blade to move the stripper blade;

wherein, during operation, the first and second drive wheels are configured to rotate independently to rotate the actuating wheel independent from the blade wheel such that the actuator moves the stripper blade relative to the wire opening in the blade wheel.

20. A rotary stripping device for a wire comprising:

a support panel having a wire opening configured to receive an end of the wire; and a wire stripper mounted to the support panel, the wire stripper comprising an actuating wheel and a blade wheel independently movable relative to the actuating wheel at variable rates relative to each other by a drive assembly, the actuating wheel having a wire opening aligned with the wire opening of the support panel to receive the wire, the blade wheel having a wire opening aligned with the wire opening of the support panel to receive the wire, the wire stripper having a stripper blade held by the blade wheel having a cutting edge configured to engage the wire, the wire stripper having an actuator associated with the actuating wheel operably coupled to the stripper blade to move the stripper blade, the actuator causing the stripper blade to move as the actuating wheel is moved relative to the blade wheel to move the cutting edge of the stripper blade relative to the wire opening in the blade wheel.

21. The rotary stripping device of claim 20, wherein the drive assembly is operably coupled to the actuating wheel to drive the actuating wheel and the drive assembly is operably coupled to the blade wheel to drive the blade wheel.

* * * * *